(12) United States Patent
Okamura

(10) Patent No.: US 8,352,345 B2
(45) Date of Patent: Jan. 8, 2013

(54) STOCK NAME SEARCH DEVICE, STOCK NAME SEARCH METHOD, AND INFORMATION STORAGE MEDIUM

(75) Inventor: Noriaki Okamura, Kanagawa (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 1040 days.

(21) Appl. No.: 12/294,172

(22) PCT Filed: Feb. 21, 2007

(86) PCT No.: PCT/JP2007/053172
§ 371 (c)(1),
(2), (4) Date: Sep. 23, 2008

(87) PCT Pub. No.: WO2007/111061
PCT Pub. Date: Oct. 4, 2007

(65) Prior Publication Data
US 2009/0125453 A1    May 14, 2009

(30) Foreign Application Priority Data
Mar. 24, 2006  (JP) .................................. 2006-082624

(51) Int. Cl.
*G06Q 40/00*  (2006.01)
(52) U.S. Cl. ...................................... 705/36 R
(58) Field of Classification Search ................ 705/1–80; 715/1–15; 215/2–18; 382/1–131; 707/737–741
See application file for complete search history.

(56) References Cited

U.S. PATENT DOCUMENTS

| | | | |
|---|---|---|---|
| 5,012,279 A | 4/1991 | Nakajima et al. | |
| 2003/0014343 A1* | 1/2003 | Jones | 705/36 |
| 2003/0130967 A1 | 7/2003 | Mannila et al. | |
| 2003/0139957 A1 | 7/2003 | Satchwell | |
| 2005/0278237 A1* | 12/2005 | Dankovchik et al. | 705/35 |
| 2006/0059072 A1 | 3/2006 | Boglaev | |

FOREIGN PATENT DOCUMENTS

| | | | |
|---|---|---|---|
| JP | 63-143668 A | 6/1988 | |
| JP | 64-21499 A | 1/1989 | |
| JP | 64021499 A | 1/1989 | |
| JP | 2-16676 A | 1/1990 | |
| JP | 212276 A | 1/1990 | |

(Continued)

OTHER PUBLICATIONS

Bing Han and Jason Hsu, A Synthesis on Stock Momentum, Dec. 2004, Fisher college of Business at the Ohio State University and Research Affiliates, LLC, web, 1-23.*

(Continued)

*Primary Examiner* — Marissa Liu
(74) *Attorney, Agent, or Firm* — Sughrue Mion, PLLC

(57) ABSTRACT

In order to allow a user to quickly select a stock name with a stock price transition of a desired pattern from among a large number of stock names, a stock name search device includes: a similarity calculation unit (60) for calculating a similarity between a stock price transition handwritten-inputted by the user and each of stock price transitions of a plurality of stock names; a stock name list generation unit (66) for selecting some of the plurality of stock names based on the similarity and generating a list of the selected stock names; and an output unit (68) for outputting information concerning the selected stock names.

7 Claims, 10 Drawing Sheets

FOREIGN PATENT DOCUMENTS

| | | |
|---|---|---|
| JP | 3-268185 A | 11/1991 |
| JP | 4-188273 A | 7/1992 |
| JP | 04188273 A | 7/1992 |
| JP | 5-204991 A | 8/1993 |
| JP | 05204991 A | 8/1993 |
| JP | 8-95959 A | 4/1996 |
| JP | 10-240716 A | 9/1998 |
| JP | 10240716 A | 9/1998 |
| JP | 2004-110823 A | 4/2004 |
| JP | 2004110823 A | 4/2004 |
| JP | 2005004393 A | 1/2005 |
| JP | 2005-31838 A | 2/2005 |
| JP | 2005031438 A | 2/2005 |
| JP | 2005004393 A | 1/2006 |
| KR | 20030092948 A | 12/2003 |
| KR | 1020050102535 A | 10/2005 |
| WO | 2004042493 A2 | 5/2004 |

OTHER PUBLICATIONS

European Search Report dated Feb. 6, 2009.
Taiwanese Office Action corresponding to Taiwanese Patent Application No. 095127067, dated Jul. 26, 2010.
Korean Office Action corresponding to Korean Patent Application No. 10-2008-7024312, mailed Sep. 20, 2010.
Taiwanese Search Report corresponding to Taiwanese Patent Application No. 095127067, dated Jul. 15, 2010.

\* cited by examiner

FIG. 1
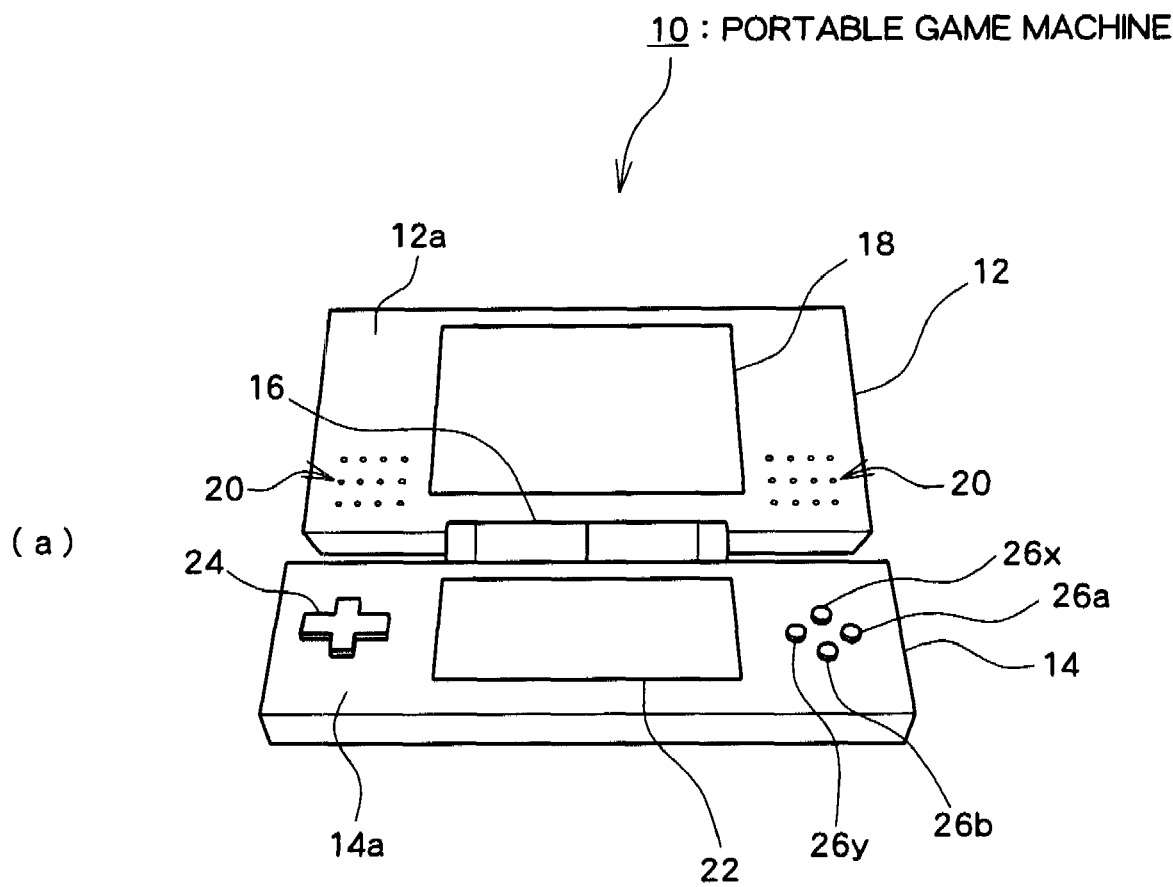
(a)
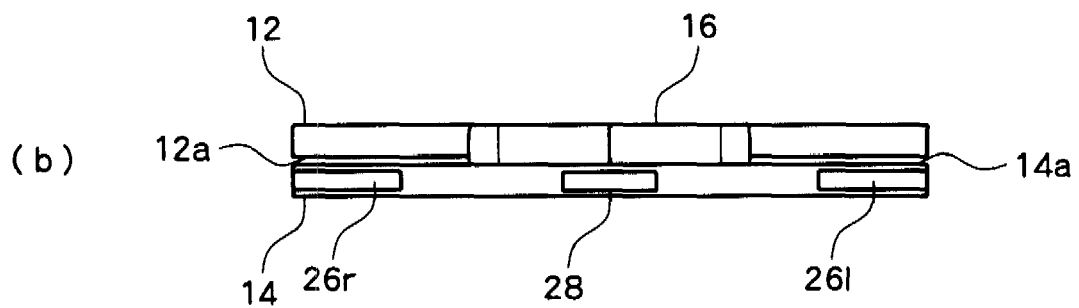
(b)

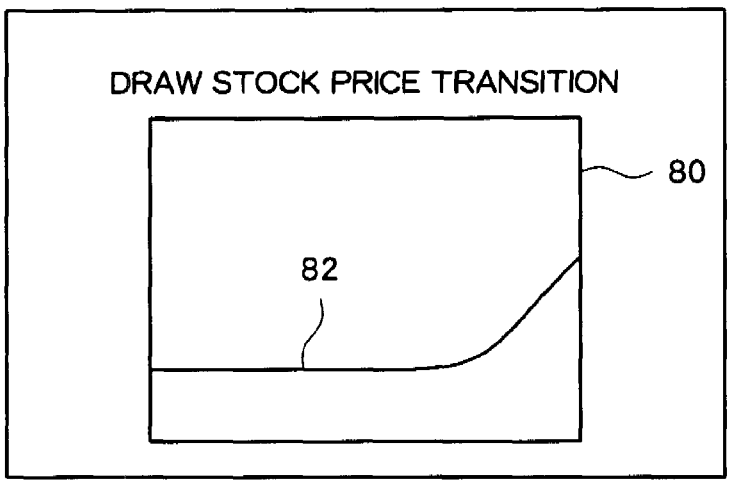

STOCK NAME SEARCH DEVICE, STOCK NAME SEARCH METHOD, AND INFORMATION STORAGE MEDIUM

TECHNICAL FIELD

The present invention relates to a stock name search device, a stock name search method, and an information storage medium.

BACKGROUND ART

A stock price chart is used to describe a stock price transition on a stock name basis, examples of which include a daily chart that expresses a daily price movement as one candle and a weekly chart that expresses a weekly price movement as one candle. It is empirically known that if the stock price transition described in the stock price chart exhibits a specific pattern, for example, a "head and shoulders bottom" pattern or a "double bottom" pattern, a time that is good to buy or sell will arrive in the near future. Therefore, a stock investor often refers to stock price charts for not only a stock name on which their attention is focused but also other stock names, to check whether or not there is a stock price transition exhibiting such a pattern. Note that Patent Document 1 listed below discloses a system for generating a stock price chart.

Patent Document 1: JP 2005-31838 A

DISCLOSURE OF THE INVENTION

Problems to be Solved by the Invention

However, there are such an enormous number of stock names that it takes a massive amount of time to refer to the stock price charts for individual stock names to judge whether or not there is a stock price transition exhibiting such a specific pattern every time. Therefore, conventionally, there is no other choice in actuality but to check the stock price charts for only some of the stock names depending on a ranking in terms of an index such as a volume or results of a conditional search with reference to such an index.

The present invention has been made in view of the above-mentioned problem, and an object thereof is to provide a stock name search device, a stock name search method, and an information storage medium, which allow a user to quickly select a stock name with a stock price transition of a desired pattern from among a large number of stock names.

Means for Solving the Problems

In order to solve the above problem, a stock name search device according to the present invention includes: handwritten segment transition information generation means for generating a segment transition information item representing a stock price transition within each of a predetermined number of segments included in a target period based on handwritten data representing a stock price transition handwritten-inputted by a user; stock name segment transition information storage means for storing a segment transition information item representing a stock price transition within each of the predetermined number of segments included in the target period, which is generated based on stock price chart data representing each of stock price transitions of a plurality of stock names; similarity calculation means for reading segment transition information items on the respective segments, which are stored in the stock name segment transition information storage means, by each of the stock names, and calculating similarities between the handwritten-inputted stock price transition and the stock price transitions of the stock names for all stock names to be targets, based on the read segment transition information items on the respective segments and segment transition information items on the respective segments which are generated by the handwritten segment transition information generation means; stock name selection means for selecting some of the plurality of stock names based on the similarities; and stock information output means for outputting information concerning the selected some of the stock names.

Further, a stock name search method according to the present invention includes: a handwritten segment transition information generation step of generating a segment transition information item representing a stock price transition within each of a predetermined number of segments included in a target period based on handwritten data representing a stock price transition handwritten-inputted by a user; a stock name segment transition information storage step of storing in a storage unit a segment transition information item representing a stock price transition within each of the predetermined number of segments included in the target period, which is generated based on stock price chart data representing each of stock price transitions of a plurality of stock names; a similarity calculation step of reading segment transition information items on the respective segments, which are stored in the storage unit, by each of the stock names, and calculating similarities between the handwritten-inputted stock price transition and the stock price transitions stock names for all stock names to be targets, based on the read segment transition information items on the respective segments and segment transition information items on the respective segments which are generated in the handwritten segment transition information generation step; a stock name selection step of selecting some of the plurality of stock names based on the similarities; and a stock information output step of outputting information concerning the selected stock names.

Further, the information storage medium according to the present invention relates to an information storage medium, which stores a program for causing a computer to function as: handwritten segment transition information generation means for generating a segment transition information item representing a stock price transition within each of a predetermined number of segments included in a target period based on handwritten data representing a stock price transition handwritten-inputted by a user; stock name segment transition information storage means for storing in a storage unit a segment transition information item representing a stock price transition within each of the predetermined number of segments included in the target period, which is generated based on stock price chart data representing each of stock price transitions of a plurality of stock names; similarity calculation means for reading segment transition information items on the respective segments, which are stored in the storage unit, by each of the stock names, and calculating similarities between the handwritten-inputted stock price transition and the stock price transitions of the stock names for all of the stock names to be targets, based on the read segment transition information items on the respective segments and segment transition information items on the respective segments which are generated by the handwritten segment transition information generation means; stock name selection means for selecting some of the plurality of stock names based on the similarities; and stock information output means for outputting information concerning the selected some of the stock names. Examples of the computer include a home-use game machine, an arcade game machine, a portable game machine, a mobile telephone set, a mobile information terminal, a personal computer, a server computer, and a home server. The program may be stored in a computer-readable information storage medium such as a DVD-ROM or a CD-ROM.

According to the present invention, when the user handwrites a stock price transition, a stock name that makes a stock price transition similar to the transition is selected, which makes it possible to quickly select a stock name that makes a stock price transition exhibiting a desired pattern from among a large number of stock names.

Further, the stock price transitions can be compared with each other on a segment basis, making it possible to calculate the similarity between the stock price transitions by simple processing.

In this case, the stock name search device may further include handwritten-input means for inputting the stock price transition handwritten-inputted by the user as the handwritten data. This allows the user to input the stock price transition directly to the stock name search device.

Further, the stock name search device may further include stock name segment transition information generation means for generating the segment transition information item representing the stock price transition within each of the predetermined number of segments included in the target period, based on the stock price chart data representing each of the stock price transitions of the stock names.

Further, the similarity calculation means may calculate a segment similarity representing a similarity between the segment transition information item on each of the segments generated by the handwritten segment transition information generation means and the segment transition information item on a segment corresponding to the each of the segments, which is stored in the stock name segment transition information storage means, and based on the segment similarity, calculate a similarity between the handwritten-inputted stock price transition and a stock price transition of each of the stock names.

Further, the similarity calculation means may apply weights to each of the calculated segment similarities, and based on the weighted segment similarities, calculate the similarity between the handwritten-inputted stock price transition and the stock price transition of each of the stock names. Therefore, when the similarity between the stock price transitions is calculated, it is possible to change an extent to which the similarity between the stock price transitions is influenced depending on the segment included in the target period. Accordingly, it is possible to preferably select the stock name that makes a stock price transition desired by the user by allowing the extent to which the similarity between the stock price transitions is influenced to, for example, increase as the segment of the segment similarity becomes closer to the current date and time, and on the other hand decrease as the segment of the segment similarity becomes further from the current date and time.

Further, the stock name search device may further include segment setting means for temporarily setting the predetermined number of segments included in the target period, in the handwritten data representing the stock price transition handwritten-inputted by the user and the stock price chart data representing the stock price transition of each of the stock names, and further setting the predetermined number of segments by selecting an extremal value of the stock price transition as a feature point and changing positions of boundaries between the segments so that a boundary passing through the feature point exists. Accordingly, the segments are divided according to, for example, a position of the feature point, which makes it possible to appropriately generate the segment transition information on each segment.

BRIEF DESCRIPTION OF THE DRAWINGS

FIGS. 1 are diagrams showing external appearances of a portable game machine used as a stock name search device according to an embodiment of the present invention.

FIG. 3 is a diagram showing an example of an input screen for a stock price transition.

FIGS. 4 are diagrams showing examples of a screen for displaying results of a stock name search.

BEST MODE FOR CARRYING OUT THE INVENTION

Figure 2:
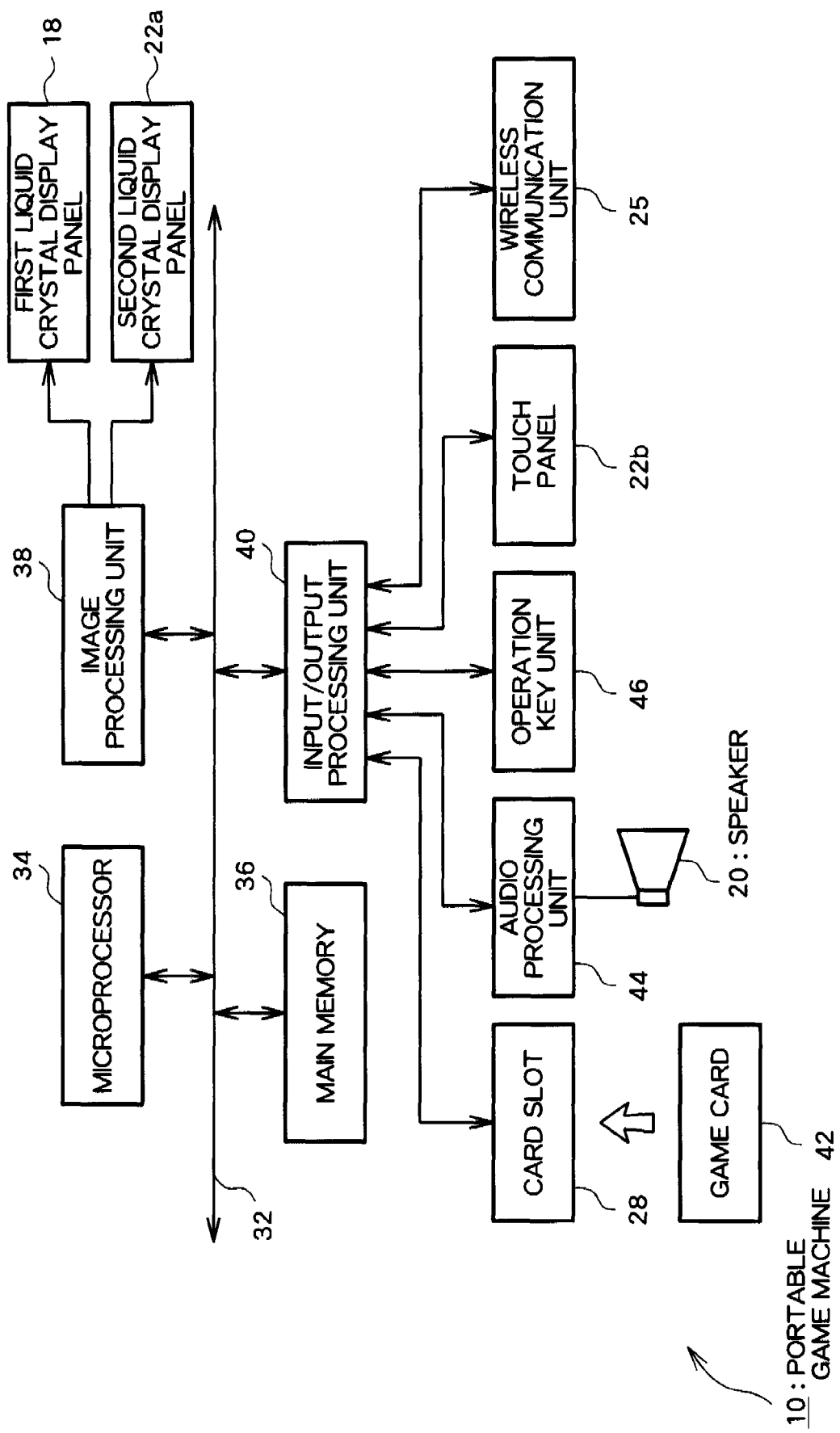
FIG. 2 is a diagram showing a hardware configuration of the portable game machine.

Hereinafter, an embodiment of the present invention will be described in detail with reference to the drawings.

FIGS. 1 show external appearances of a portable game machine used as a stock name search device according to this embodiment. FIG. 1(*a*) is a perspective view showing a state in which a portable game machine 10 is viewed from the front side. As shown in FIG. 1(*a*), the portable game machine 10 is structured by including an upper casing 12 and a lower casing 14. The upper casing 12 and the lower casing 14 are coupled to each other via a hinge portion 16. The portable game machine 10 assumes a play state (see FIG. 1(*a*)) in which a player can view a surface 12*a* of the upper casing 12 and a surface 14*a* of the lower casing 14 and a folded state (see FIG. 1(*b*)) in which the surface 12*a* of the upper casing 12 and the surface 14*a* of the lower casing 14 are brought together so as to face each other.

The upper casing 12 has the surface 12*a* provided with a first liquid crystal display panel 18. In addition, the upper casing 12 has a speaker 20 built therein. On the other hand, the lower casing 14 has the surface 14*a* provided with a touch screen 22, a cross button 24, and buttons 26*a*, 26*b*, 26*x*, and 26*y*. The touch screen 22 is structured by overlaying a touch panel on a second liquid crystal display panel.

FIG. 1(b) is a back view of the portable game machine 10 in the folded state. As shown in FIG. 1(b), the lower casing 14 has a back side surface provided with buttons 26l and 26r on its left and right, respectively. In addition, the back side surface of the lower casing 14 is provided in its center with a card slot 28 structured so that a game card (memory card) is detachably attached thereto. The card slot 28 has an opening for receiving the game card, and is provided in its recessed portion with a signal input/output terminal. By pushing in the game card through the opening and interconnecting the signal input/output terminal and a terminal of the game card, it is possible to exchange a signal between the card slot 28 and the game card.

The portable game machine 10 is also attached with other members (not shown) such as a power switch. The portable game machine 10 is battery-driven, allowing a user thereof to play a game on the portable game machine 10 without selecting a place to play the game.

FIG. 2 shows a hardware configuration of the portable game machine according to this embodiment. As shown in FIG. 2, the portable game machine 10 is a known computer game system configured to include a bus 32, a microprocessor 34, a main memory 36, an image processing unit 38, the first liquid crystal display panel 18, the second liquid crystal display panel 22a, an input/output processing unit 40, the card slot 28, an audio processing unit 44, a speaker 20, an operation key unit 46, a touch panel 22b, and a wireless communication unit 25. Those components are received in a casing along with a battery, and are driven by the battery.

The bus 32 is used for exchanging an address and data among the respective components of the portable game machine 10. The microprocessor 34, the main memory 36, the image processing unit 38, and the input/output processing unit 40 are connected to one another via the bus 32 so as to allow two-way data communications.

The microprocessor 34 controls each component of the portable game machine 10 based on an operating system stored in a ROM (not shown) and a game program stored in the a game card 42. The main memory 36 is configured to include, for example, a RAM, and the game program read from the game card 42 is written to the main memory 36 as the need arises. The main memory 36 is also used as a work area for the microprocessor 34.

The first liquid crystal display panel 18 and the second liquid crystal display panel 22a are constructed of known liquid crystal display panels. The image processing unit 38 outputs game screen data generated by the microprocessor 34 to be displayed on the first liquid crystal display panel 18 and/or the second liquid crystal display panel 22a at a predetermined timing.

The input/output processing unit 40 is an interface for allowing the microprocessor 34 to exchange data with the card slot 28, the audio processing unit 44, the operation key unit 46, the touch panel 22b, and the wireless communication unit 25. The input/output processing unit 40 is connected with the card slot 28, the audio processing unit 44, the operation key unit 46, the touch panel 22b, and the wireless communication unit 25.

The card slot 28 reads various sorts of data such as the game program stored in the game card 42 according to an instruction from the microprocessor 34. Note that the game card 42 is used herein for supplying various sorts of data to the portable game machine 10, but a CD-ROM, a DVD, and all other kinds of such information storage media may be used. Alternatively, it is possible to supply the various sorts of data from a remote site to the portable game machine 10 via a communication network such as the Internet, or it is possible to supply the various sorts of data from a stationary game machine or a personal computer to the portable game machine 10 by using various data communications such as infrared communications.

The audio processing unit 44 is configured by including a sound buffer, and outputs to the speaker 20 various sorts of audio data such as game music, game effect sounds, and messages, which are stored in the sound buffer after being read from the game card 42.

The operation key unit 46 serves as input means for allowing the player to perform a game operation, and is constructed by including the cross button 24 and the buttons 26a, 26b, 26x, 26y, 26l, and 26r. The input/output processing unit 40 scans a state of each component of the operation key unit 46 every predetermined cycle (for example, every $1/60^{th}$ of a second), and passes an operation signal representing a result of the scanning to the microprocessor 34 via the bus 32. The microprocessor 34 judges which kind of game operation is to be performed by the player based on the operation signal.

The touch panel 22b serves as input means for allowing the player to perform a game operation input. The touch panel 22b supplies a signal representing a position information corresponding to a position where the touch panel 22b is depressed by a player's finger, a pen, or the like to the microprocessor 34. The wireless communication unit 25 is used for exchanging data with an external server, which is connected to a wide-area data communication network such as the Internet via a wireless LAN or the like.

The stock name search device according to this embodiment is implemented by attaching the game card 42 storing a stock name search program to the portable game machine 10 having the above-mentioned structure/configuration and by executing the program. In searching for a stock name, the stock name search device displays an input screen for a stock price transition shown in FIG. 3 on the touch screen 22. As described above, the touch screen 22 includes the touch panel 22b, and when a stock price transition 82 is handwritten within a frame 80 displayed on the stock price transition input screen, a handwritten position information string is inputted to the portable game machine 10. The position information string is used as data (handwritten data) representing the stock price transition handwritten by the user.

When the user handwrites the stock price transition on the touch screen 22, search processing for a stock name is executed, and if stock names exist that exhibit a similar stock price transition, a stock name list of FIG. 4(a) is displayed on the touch screen 22. In the displayed stock name list, a button is displayed to the right of each stock name, and when the button is touched, various sorts of information concerning the stock name are displayed on the first liquid crystal display panel 18. The information displayed thereon contains, for example, a stock price chart (see FIG. 5), a volume chart, and various sorts of financial information. On the other hand, if no stock name exist that exhibits a similar stock price transition, a message to that effect is displayed on the touch screen 22 as shown in FIG. 4(b).

Hereinbelow, description will be given of the search processing for a stock name according to this embodiment.

In this embodiment, for all of the stock names to be search targets, trend data representing their stock price transition is generated, and the trend data is prestored in the stock name search device (portable game machine 10).

Figure 5:
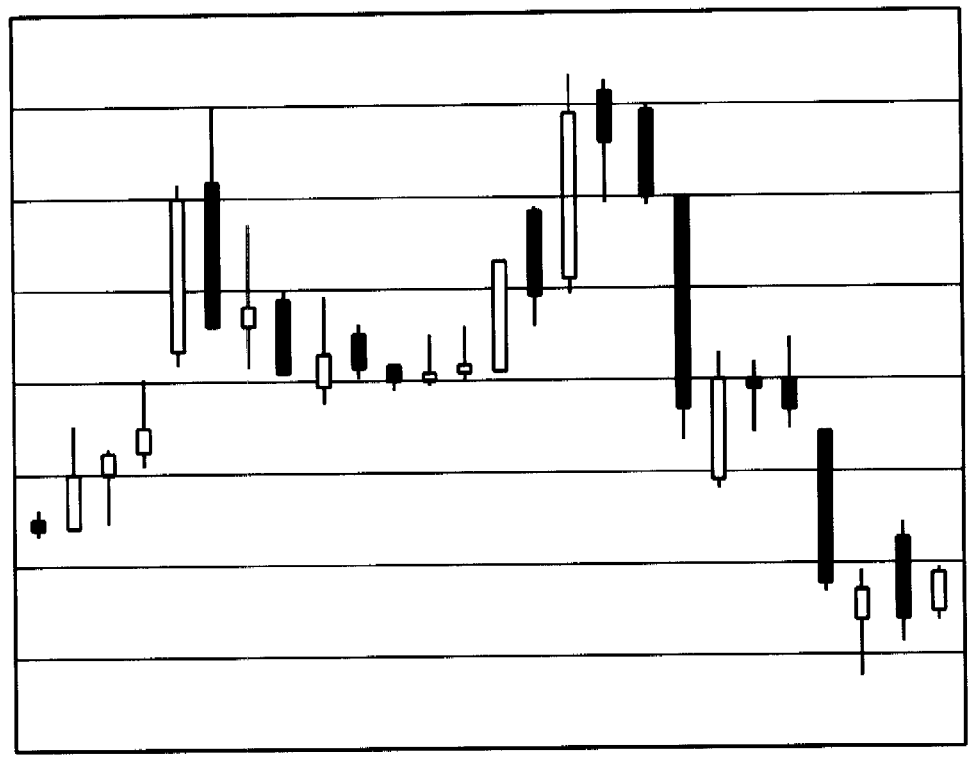
FIG. 5 is a diagram showing an example of a stock price chart.
Figure 6:
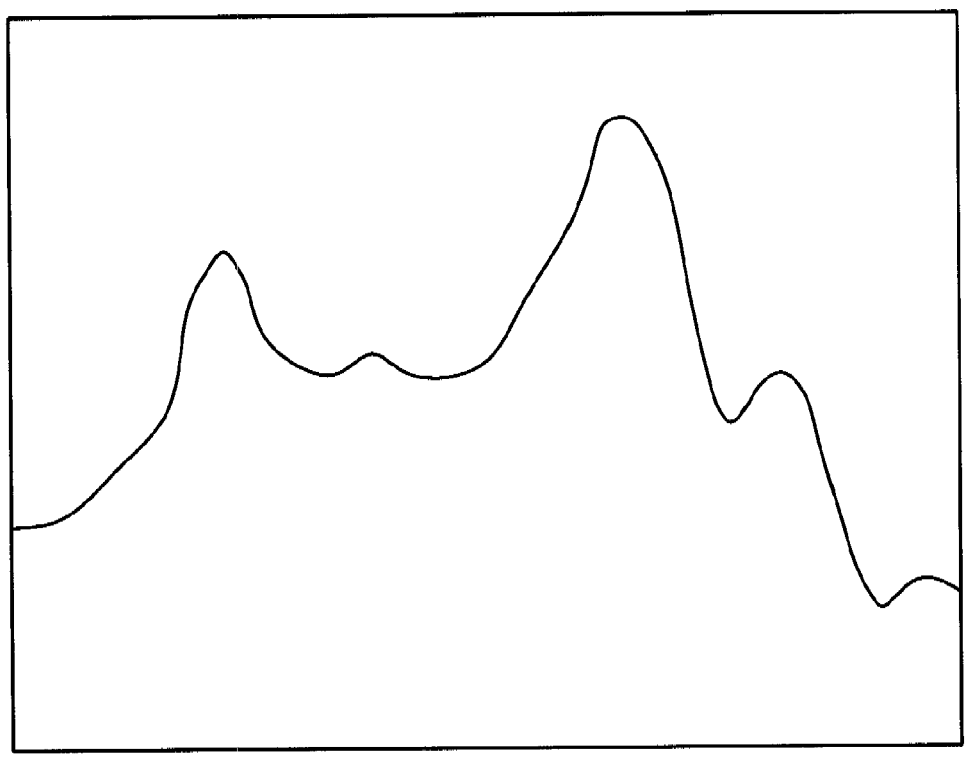
FIG. 6 is a diagram showing an example of a smoothed stock price chart.

To generate the trend data, data on a stock price chart whose example is shown in FIG. 5 is first acquired. The data on the stock price chart contains at least a daily stock price or a weekly stock price obtained during a period targeted for the data, and more specifically, contains an opening price, closing price, high-level price, and low-level price of the stock price on a daily or weekly basis. Then, the stock price chart is subjected to smoothing processing, and smoothed data on stock prices is generated. Moving average data (data on an average of stock prices for predetermined days or predetermined weeks immediately before each day or each week, respectively) can be adopted as the smoothed data. FIG. 6 shows an example of the smoothed data.

Figure 7:
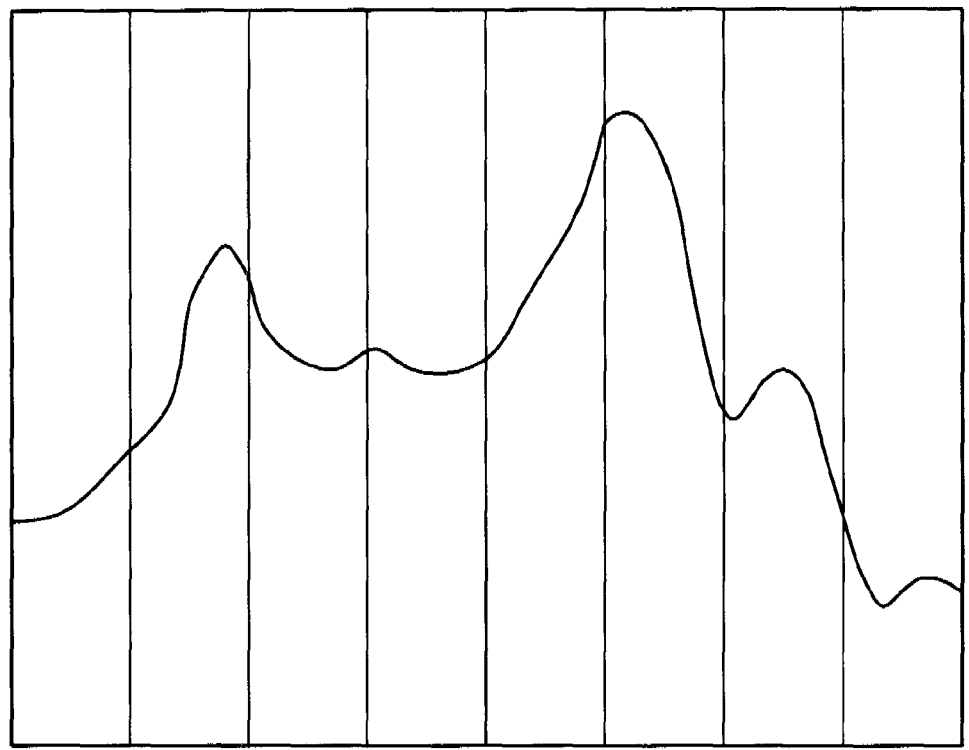
FIG. 7 is a diagram showing a state in which a target period for the stock price chart is divided into a plurality of segments.
Figure 8:
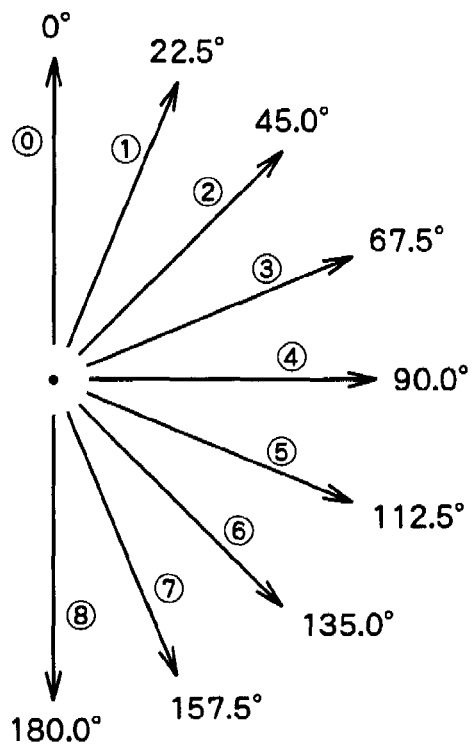
FIG. 8 is a diagram showing types of segment transition information.
Figure 9:
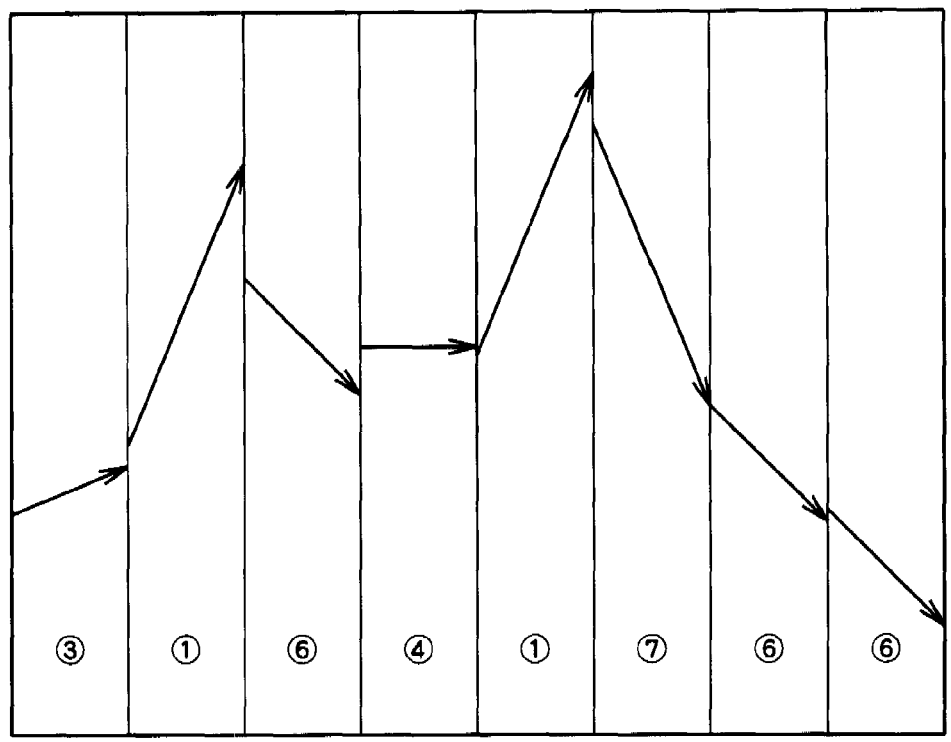
FIG. 9 is a diagram showing trend data (segment transition information strings) generated with reference to the stock price chart.

Subsequently, a target period for the smoothed data, that is, a target period for the stock price chart, is divided into a predetermined number (herein, 8). FIG. 7 shows a state in which the smoothed data is divided into 8 segments of data. For each segment, segment transition information representing a transition of stock prices within the segment is generated. The segment transition information is information for identifying which of 8 types of transition shown in FIG. 8 the transition of stock prices within each segment corresponds to. As shown in FIG. 8, the segment transition information performs identification from among a state (transition 0) in which the stock price makes a transition of Approximately 0° (which is an angle to a longitudinal axis in a positive direction) within one segment, a state (transition 1) in which a transition of approximately 22.5° is made, a state (transition 2) in which a transition of approximately 45.0° is made, a state (transition 3) in which a transition of approximately 67.5° is made, a state (transition 4) in which a transition of approximately 90.0° is made, a state (transition 5) in which a transition of approximately 112.5° is made, a state (transition 6) in which a transition of approximately 135.0° is made, a state (transition 7) in which a transition of approximately 157.5° is made, and a state (transition 8) in which a transition of approximately 180.0° is made. In this embodiment, it is judged which of the above-mentioned transitions 0 to 8 the transition of stock prices within each segment corresponds to, and the numerals 0 to 8 are outputted as segment transition information items in a segment order, and the result is set as the trend data. FIG. 9 shows how the trend data is generated based on the smoothed stock price transition shown in FIG. 7. As shown in FIG. 9, in this embodiment, it is judged which of the above-mentioned transitions 0 to 8 the smoothed stock price transition within each segment is closest to by, for example, a pattern matching processing, and the number obtained from the judgment is set as the segment transition information.

Figure 10:
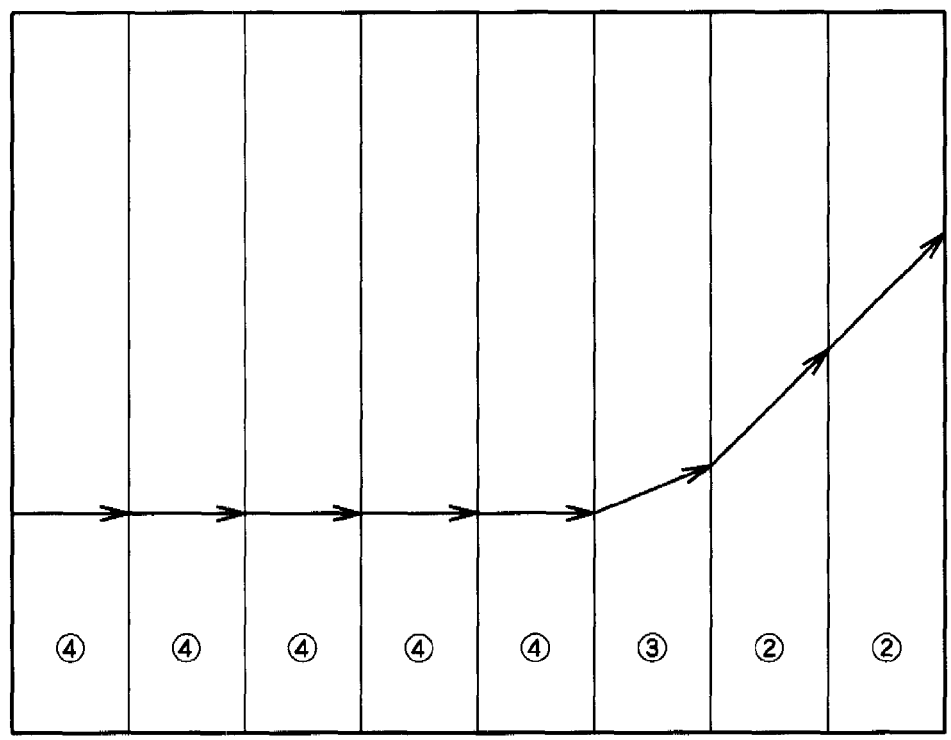
FIG. 10 is a diagram showing trend data (segment transition information strings) generated with reference to a handwritten-inputted stock price transition.

In this embodiment, using the above-mentioned procedure, the trend data is previously generated for all of the stock names to be the search targets. Further, the trend data is generated for a handwritten-inputted stock price transition as occasion demands. In other words, as shown in FIG. 10, for the handwritten-inputted stock price transition, a target period for the stock price transition is divided into a predetermined number (herein, 8), it is judged which of the above-mentioned transitions 0 to 8 the stock price transition within each segment is closest to by, for example, the pattern matching processing, and the number obtained from the judgment is set as the segment transition information. The segment transition information items are outputted in a segment order, and the resultant is set as the trend data corresponding to the handwritten-inputted stock price transition.

In this embodiment, with reference to a trend data item $A_i$ composed of segment transition information items $a_{i1} \ldots a_{i8}$, which is generated based on the stock price transition of a stock name i, and a trend data item B composed of segment transition information items $b_1 \ldots b_8$, which is generated based on the handwritten-inputted stock price transition, a similarity $S_i$ between the two stock price transitions is calculated from the following expression (1).

$$S_i = \Sigma w_j \cdot \sigma_{ij} \quad (1)$$
$$= \Sigma w_j \cdot |a_{ij} - b_j|$$

In the expression, $\sigma_{ij}(=|a_{ij}-b_j|)$ is a difference between the segment transition information item $a_{ij}$ concerning the stock name i and the segment transition information item $b_j$ concerning the handwritten-inputted stock price transition, representing a similarity between a transition within the j-th segment of the stock name i and a transition within the j-th segment of the handwritten-inputted stock price transition, that is, a segment similarity for the j-th segment of the stock name i. Further, $\Sigma$ is a sum in terms of j, and j is a value representing each segment, the value varying from 1 to 8. Further, $w_j$ is a weighting coefficient that is preset for each segment and satisfies the following expression (2), and in this case, $w_8$ closest to the current date and time assumes a greatest value of 2.0, $w_7$ assumes the second greatest value of 1.8, $w_6$ assumes a value of 1.6, $w_5$ assumes a value of 1.4, $w_4$ assumes a value of 1.2, and $w_3$ to $w_1$ each assume a value of 1.0.

$$w_1 \leq w_2 \leq \ldots \leq w_7 \leq w_8 \quad (2)$$

As described above, the similarity $S_i$ between the transition of the stock name i and the handwritten-inputted stock price transition is calculated for all of the stock names to be the search targets, and from among the stock names, stock names having the similarity $S_i$ equal to or less than a predetermined value are selected. Then, the selected stock names are listed and display-outputted as shown in FIG. 4(a).

Hereinafter, description will be given of a processing performed by the portable game machine 10.

Figure 11:
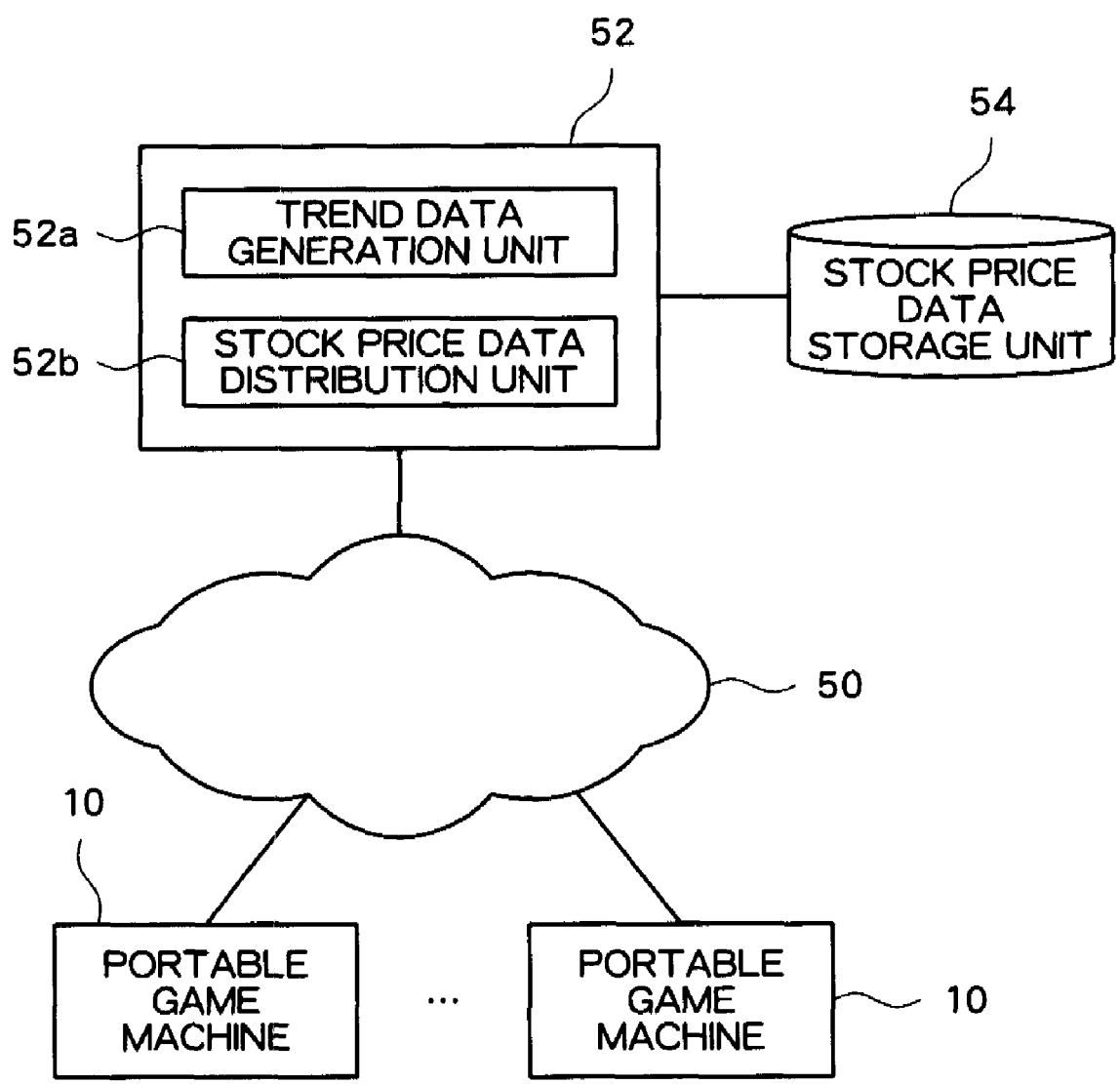
FIG. 11 is a diagram showing a state in which the stock name search device is connected to a communication network.

The portable game machine 10 includes the wireless communication unit 25 as described above, and is connected to a server 52 via a communication network 50 such as the Internet as shown in FIG. 11. The server 52 distributes stock price data and the like, and includes a stock price data storage unit 54. The stock price data storage unit 54 stores stock price chart data and the trend data on each stock name. The stock price chart data may be acquired in real time from, for example, a stock exchange.

In addition, a trend data generation unit 52a generates the trend data as described above based on the stock price chart data concerning each stock name stored in the stock price data storage unit 54. The generated trend data is stored in the stock price data storage unit 54 in association with the stock price chart data. A stock price data distribution unit 52b transmits to the portable game machine 10 the stock price data, that is, the stock price chart data and trend data on all of the stock names. The portable game machine 10 issues a transmission request for stock price data to the server 52 at an appropriate timing, and receives the stock price data from the server 52.

Figure 12:
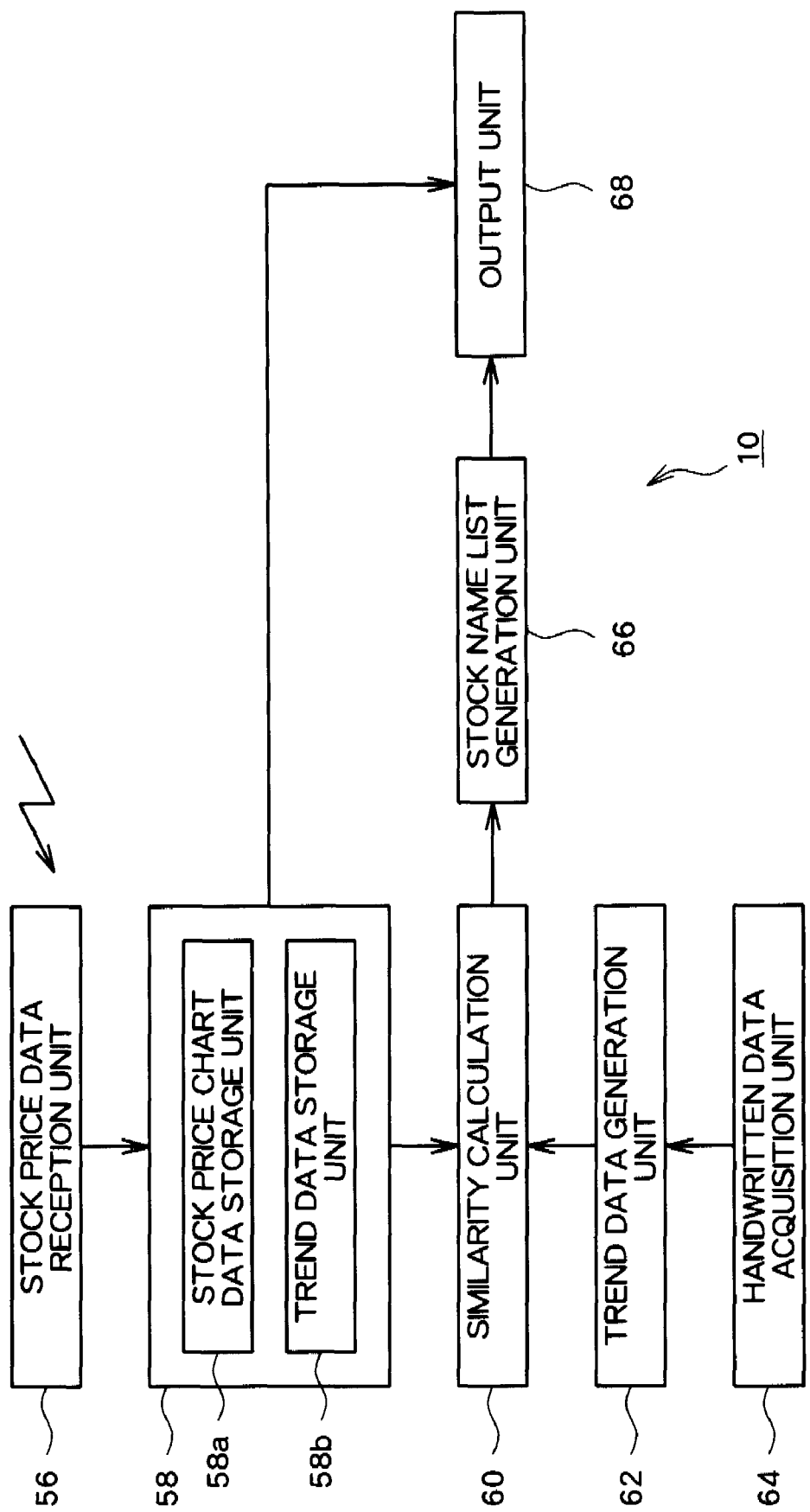
FIG. 12 is a functional block diagram of the stock name search device.

As shown in FIG. 12, the portable game machine 10 serving as the stock name search device is functionally configured by including a stock price data reception unit 56, a stock price data storage unit 58, a similarity calculation unit 60 (similarity calculation means), a trend data generation unit 62 (handwritten segment transition information generation means), a handwritten data acquisition unit 64, a stock name list generation unit 66 (stock name selection means), and a output unit 68 (stock information output means). Those functions are implemented by executing the stock name search program stored in the game card 42 on the portable game machine 10.

First, the stock price data reception unit 56 is configured by including the wireless communication unit 25, and receives stock price data from the server 52. The stock price data storage unit 58 includes a stock price chart data storage unit 58a and a trend data storage unit 58b (stock name segment transition information storage means). The stock price chart data storage unit 58a stores the stock price chart data on each stock name among the stock price data received through the stock price data reception unit 56. The trend data storage unit 58b stores the trend data item $A_i$ on each stock name among the stock price data received through the stock price data reception unit 56.

The handwritten data acquisition unit 64 acquires handwritten data inputted through the touch screen 22 (handwritten-input means).

Figure 13:
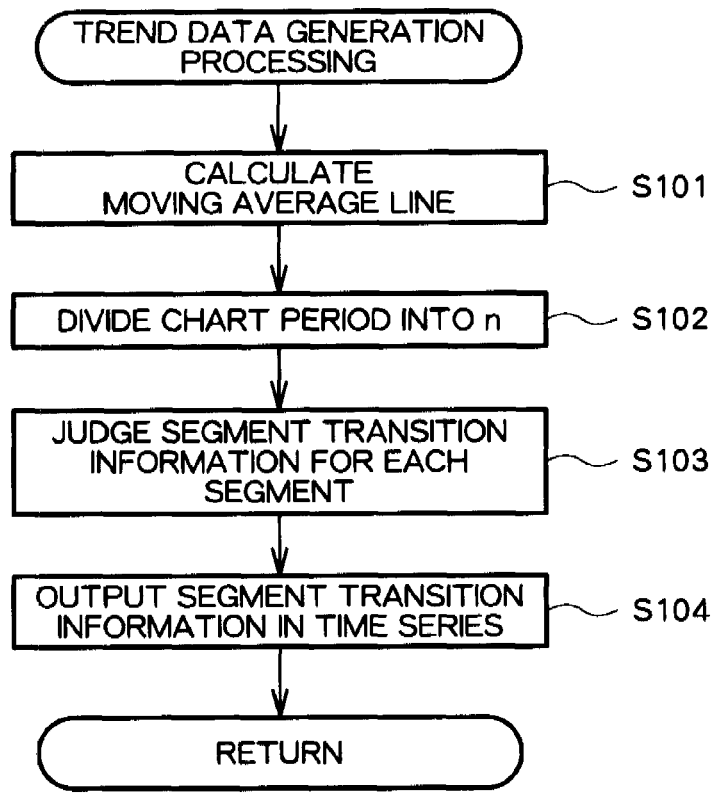
FIG. 13 is a flowchart showing trend data generation processing.

The trend data generation unit 62 generates the trend data item B representing the handwritten-inputted stock price transition based on the handwritten data as shown in FIG. 10. In other words, as shown in the flowchart of FIG. 13, based on the handwritten-inputted stock price transition, its moving average line is calculated (S101). Subsequently, the target period for the handwritten-inputted stock price transition is divided into n (herein, 8) (S102). Then, it is judged which of the above-mentioned transitions 0 to 8 the stock price transition within each segment corresponds to, and the result is set as the segment transition information item $b_j$ (S103). Further, the segment transition information items $b_j$ are outputted in a segment order, and the result is set as the trend data item B (S104).

The similarity calculation unit 60 calculates a similarity between the stock price transition handwritten-inputted by the user and each stock price transition of a plurality of stock names, and specifically, substitutes the trend data item Ai ($a_{i1}$ to $a_{i8}$) on each stock name stored in the trend data storage unit 58b and the trend data B ($b_1$ to $b_8$) generated by the trend data generation unit 62 into the above-mentioned expression (1) to thereby calculate the similarity $S_i$ for all of the stock names whose stock price data is stored in the stock price data storage unit 58.

The stock name list generation unit 66 selects some of the stock names of the search targets based on the similarity $S_i$, and generates a list thereof. To be specific, the stock name list generation unit 66 selects the stock names having the similarity $S_i$ equal to or less than a predetermined threshold, and generates a list thereof.

The output unit 68 displays the list generated by the stock name list generation unit 66 on the touch screen 22 as shown in FIG. 4(a), and for the stock name whose button has been touched, displays various sorts of stock information such as the stock price chart which are stored in the stock price chart data storage unit 58a on the first liquid crystal display panel 18.

According to the stock name search device described above, when the user handwrites a stock price transition on the touch screen 22, a stock name that makes a stock price transition similar to the transition is selected from among a large number of stock names whose stock price data is stored in the stock price data storage unit 58, which makes it possible to quickly select a stock name that makes a stock price transition exhibiting a desired pattern from among a large number of stock names. In particular, adopting such an extremely intuitive interface as to allow the user to handwrite a desired stock price transition on the touch screen 22 makes it possible for the user to find the stock name that makes a desired stock price transition with ease. Further, the trend data items $A_i$ and B are each composed of segment transition information items on the respective segments as described above, and have an extremely small data size. Accordingly, it is possible to transmit the data from the server 52 to the portable game machine 10 at high speed.

Figure 14:
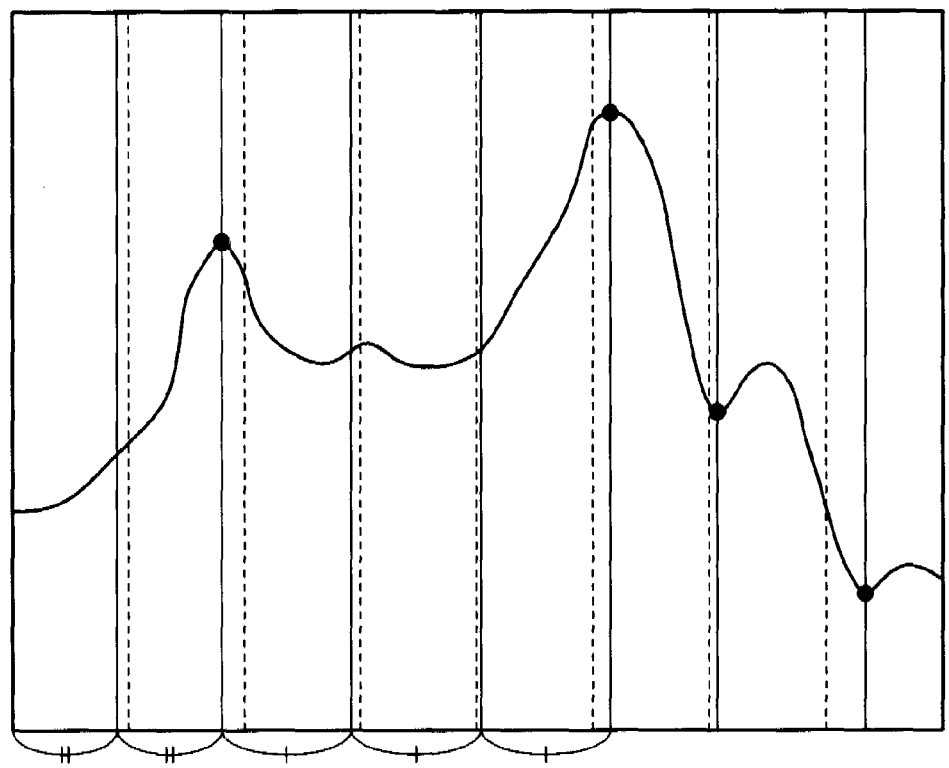
FIG. 14 is a diagram for explaining a modified example of a segment setting processing.

Note that the present invention is not limited to the above embodiment, and various modifications can be implemented. For example, the method of dividing the target period is not limited to the method described above in which after the stock price transition are smoothed, the target period is divided equally to generate the segment transition information for each segment. For example, after segments are temporarily set by dividing the target period equally into n (herein, 8) as indicated by the dotted line of FIG. 14, singular points (indicated by the black disc in FIG. 14) of the smoothed stock price transition are examined. For example, a local maximum point, a local minimum point, or a point exhibiting an inflection rate equal to or greater than a predetermined value are selected from the smoothed stock price transition as the singular points. Then, each boundary (dotted line of FIG. 14) closest to such a singular point is changed in position so as to pass through the singular point. Further, the rest of the boundaries are relocated so as to equally divide a period between the boundaries each passing through the singular point. This prevents a singular point from appearing in a stock price transition within the set segment, which makes it easy to express the stock price transition by the above-mentioned transitions 0 to 8. Accordingly, it is possible to appropriately generate the trend data $A_i$.

Further, in the above description, the trend data on the stock price transition of all of the stock names to be the search targets is generated by the server 52, but based on the stock price chart data, the trend data $A_i$ thereon may be generated by the trend data generation unit 62 of the portable game machine 10 (stock name segment transition information generation means).

Figure 15:
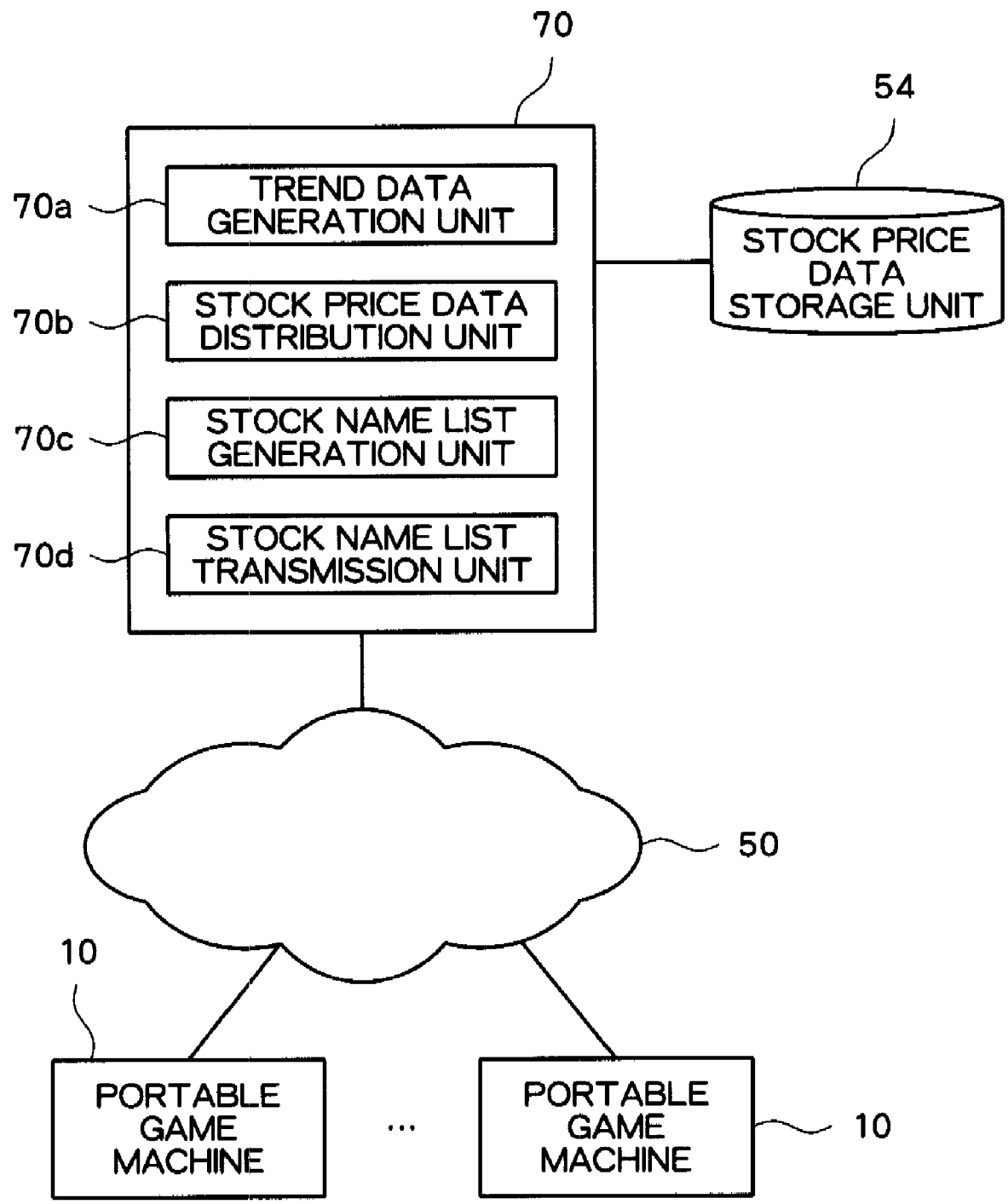
FIG. 15 is a diagram for explaining a stock name search device according to the modified example.

Further, a server connected to the communication network 50 may be configured as the stock name search device. FIG. 15 shows such a modified example, and a server 70 shown in FIG. 15 is configured by including a trend data generation unit 70a, a stock price data distribution unit 70b, a stock name list generation unit 70c, and a stock name list transmission unit 70d. Based on the stock price chart data on all of the stock names to be the search targets stored in the stock price data storage unit 54, the trend data generation unit 70a generates the trend data $A_i$ thereon, and stores the trend data $A_i$ in the stock price data storage unit 54. The stock price data distribution unit 70b transmits the stock price chart data stored in the stock price data storage unit 54 in response to a request from the portable game machine 10. The stock name list generation unit 70c receives from the portable game machine 10 data representing the stock price transition handwritten-inputted by the user, and generates a list of stock names that make a stock price transition similar to the stock price transition. The data received from the portable game machine 10 may be the above-mentioned handwritten data or may be the trend data B generated from the handwritten data. The processing of generating the list of stock names is the same as the above-mentioned processing performed on the portable game machine 10. The stock name list transmission unit 70d returns the list generated by the stock name list generation unit 70c to the portable game machine 10. This configuration can reduce the load on the processing performed by the portable game machine 10.

The invention claimed is:

1. A stock name search device, comprising:
   processor with memory programmed to generate user trend data over a target time period comprising a plurality of segments over the target time period based on a user input representing a stock price transition over the target time period;

the processor with memory programmed to store reference trend data defined as data with reference to a stock price chart, including representing the stock price transition and respective stock names within each of the plurality of segments included in the target time period, based on reference stock price data representing reference stock price transitions of the respective stock names;

the processor with memory programmed to calculate similarities between the user trend data and the reference trend data, wherein the similarities between the user trend data and the reference trend data are calculated based on the following formula:

$$S_i = \Sigma W_j \cdot \sigma_{ij}$$

wherein for an one of the stock names, $S_i$ represents one of the similarities, $W_j$ represents a weighting coefficient, $\sigma_{ij}$ represents a difference between the user trend data and the reference data;

the processor with memory programmed to select at least one of the plurality of stock names having a calculated similarity less than or equal to a threshold; and the processor with memory programmed to output information concerning the selected at least one of the plurality of the stock names.

2. The stock name search device according to claim 1, further comprising the processor with memory programmed to generate reference trend information for each of the segments included in the target period, based on stock price chart data representing each of the stock names.

3. The stock name search device according to claim 1, wherein the processor with memory programmed to calculate a segment similarity representing a similarity between the user trend data and the reference trend data for the each of the segments, and wherein the processor with memory programmed to calculate, based on the segment similarity, the similarities between the user trend data and the reference trend data for each of the stock names.

4. The stock name search device according to claim 3, wherein the processor with memory programmed to weigh each of the calculated segment similarities, and based on the weighted, calculated segment similarities, calculates the similarity between the user trend data and the reference trend data for each of the stock names.

5. A stock name search method, comprising:

generating, by a processor, user trend data over a target time period comprising a plurality of segments over the target time period based on a user input representing a stock price transition over the target time period;

storing, by the processor, reference trend data in a storage unit, the reference trend data defined as data with reference to a stock price chart, including representing a stock price transition and respective stock names within each of the plurality of segments included in the target time period, based on reference stock price data representing reference stock price transitions of the respective stock names;

calculating, by the processor, similarities between the user trend data and the reference trend data, wherein the calculating, by the processor, the similarities between the user trend data and the reference trend data based on the following formula:

$$S_i = \Sigma W_j \cdot \sigma_{ij}$$

wherein for any one of the stock names, $S_i$, represents one of the similarities, $W_j$ represents a weighting coefficient, $\sigma_{ij}$ represents a difference between the user trend data and the reference data;

selecting, by the processor, at least one of the plurality of stock names having a calculated similarity less than or equal to a threshold; and outputting, by the processor, information concerning the selected at least one of the plurality of the stock names.

6. The device of claim 1, wherein the user trend data comprises a position information string indicative of a price movement of one of a plurality of stocks representative of the respective stock names over the target time period including the plurality of the segments.

7. The method of claim 5, wherein the user trend data comprises a position information string indicative of a price movement of one of a plurality of stocks representative of the respective stock names over the target time period including the plurality of the segments.

* * * * *